United States Patent [19]
Woller et al.

[11] Patent Number: 5,226,505
[45] Date of Patent: Jul. 13, 1993

[54] PORTABLE CLIMBING PLATFORM

[76] Inventors: Ronald R. Woller, 2305 Stratford Rd., SE.; John A. Woller, 2311 College St., SE., both of Decatur, Ala. 35601

[21] Appl. No.: 802,727

[22] Filed: Dec. 5, 1991

[51] Int. Cl.⁵ ............................................. A45F 3/00
[52] U.S. Cl. .................................. 182/187; 182/134
[58] Field of Search ............... 182/187, 189, 134, 135, 182/136; 108/108

[56] References Cited

U.S. PATENT DOCUMENTS

| | | | |
|---|---|---|---|
| 3,485,320 | 12/1969 | Jones | 182/129 |
| 3,856,111 | 12/1974 | Baker | 182/135 |
| 3,955,645 | 5/1976 | Dye | 182/135 |
| 3,960,240 | 6/1976 | Cotton | 182/20 |
| 4,130,180 | 12/1978 | Ferguson et al. | 182/187 |
| 4,137,995 | 2/1979 | Fonte | 182/135 |
| 4,168,765 | 9/1979 | Ferguson et al. | 182/135 |
| 4,230,203 | 10/1980 | Sweat et al. | 182/134 |
| 4,244,445 | 1/1981 | Strode | 182/187 X |
| 4,316,526 | 2/1982 | Amacker | 182/135 |
| 4,321,983 | 3/1982 | Nelson | 182/136 |
| 4,331,216 | 5/1982 | Amacker | 182/135 |
| 4,417,645 | 11/1983 | Untz | 182/135 |
| 4,427,092 | 1/1984 | Tentler | 182/134 |
| 4,452,338 | 6/1984 | Untz | 182/187 |
| 4,597,473 | 7/1986 | Peck | 182/187 |
| 4,942,942 | 7/1990 | Bradley | 182/187 |
| 4,953,662 | 9/1990 | Porter | 182/135 |
| 4,987,972 | 1/1991 | Helms | 182/135 |
| 5,016,733 | 5/1991 | Bradley | 182/187 |
| 5,049,110 | 9/1991 | Owens | 182/133 X |

*Primary Examiner*—Karen J. Chotkowski
*Attorney, Agent, or Firm*—Burns, Doane, Swecker & Mathis

[57] ABSTRACT

A climbing device for a tree or other vertical columnar member having one or two generally parallel platforms, each having either fixed or pivoting members on each side. The members may be in substantially the same plane as the platform, extend along the sides of the tree, and are joined together by a connecting member, so as to encircle the tree. The two members attached to the platform may form an acute angle which allows climbing a broader range of trees, especially larger trees. The connecting member may be lengthwise adjustable to compensate for variable spacing of the two side members and also provides the means for them to be joined together. The platform(s) is supported and braced underneath by several members which terminate together to engage the tree in compression by means of two curved arches, leaving the top of the platform(s) substantially free from obstructions.

20 Claims, 11 Drawing Sheets

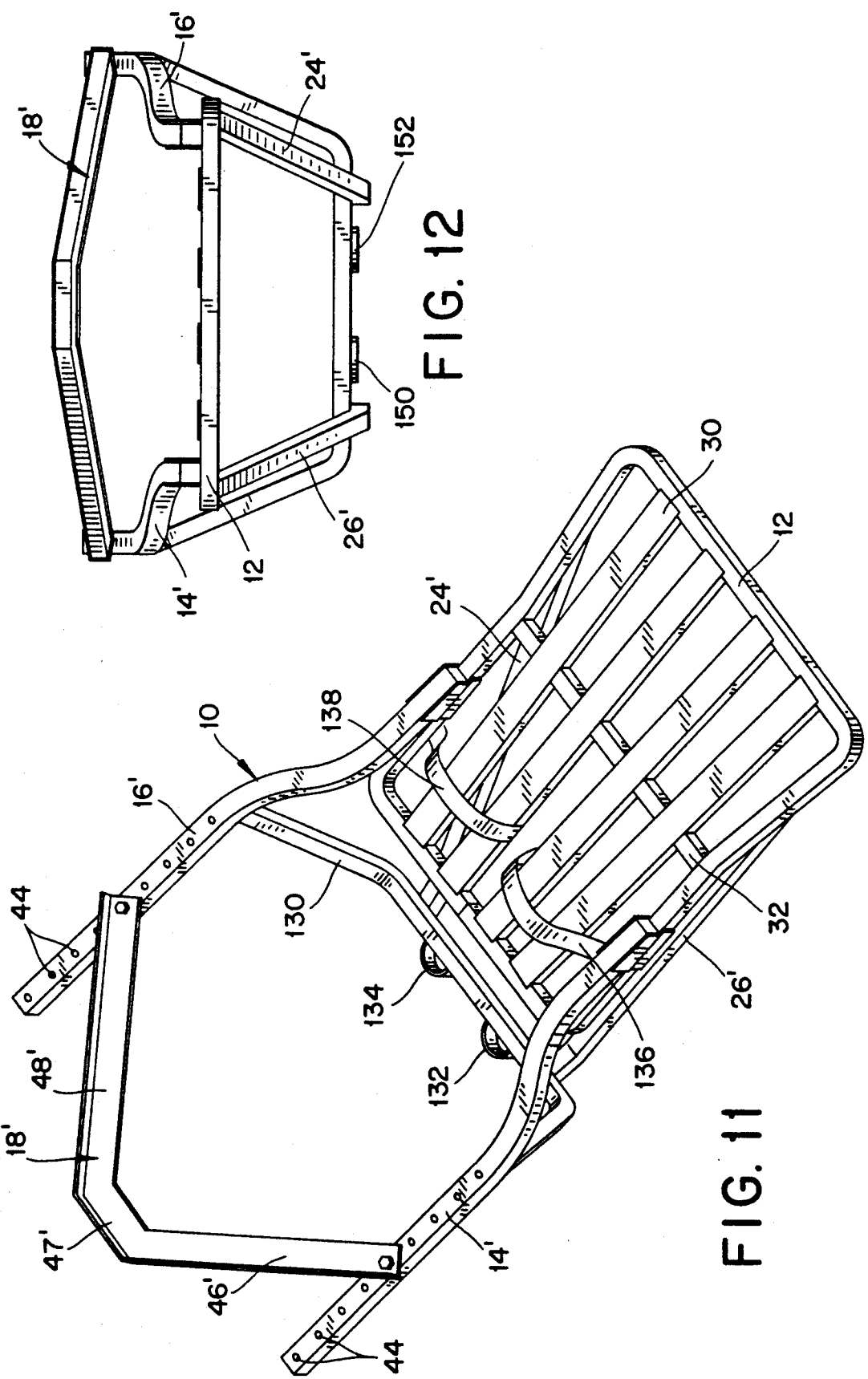

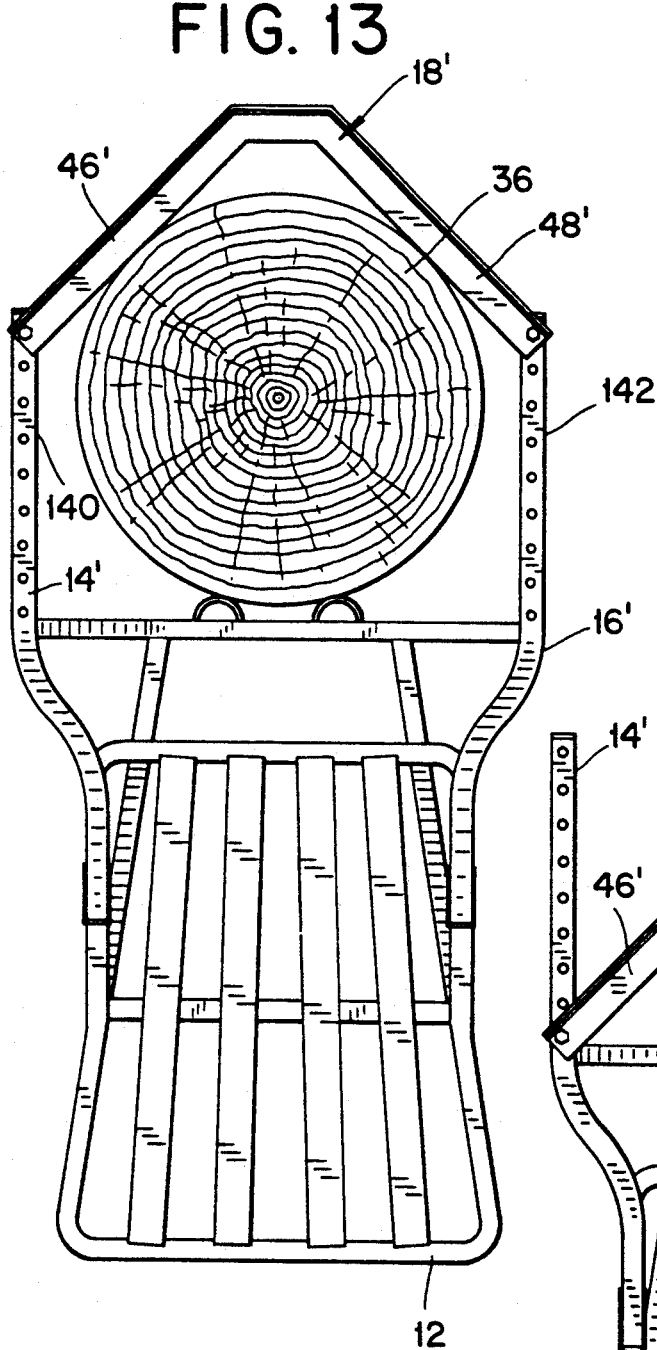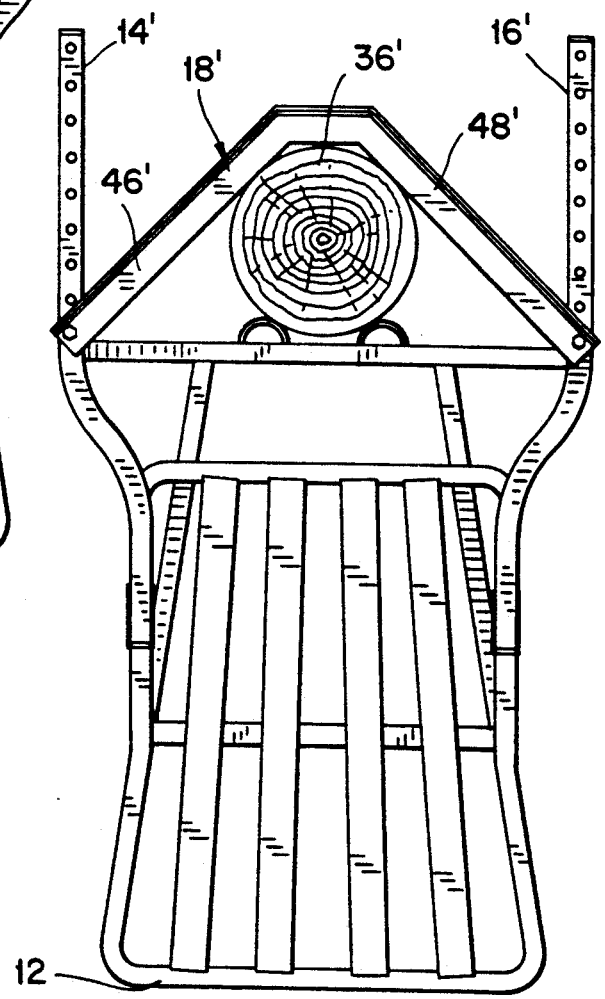

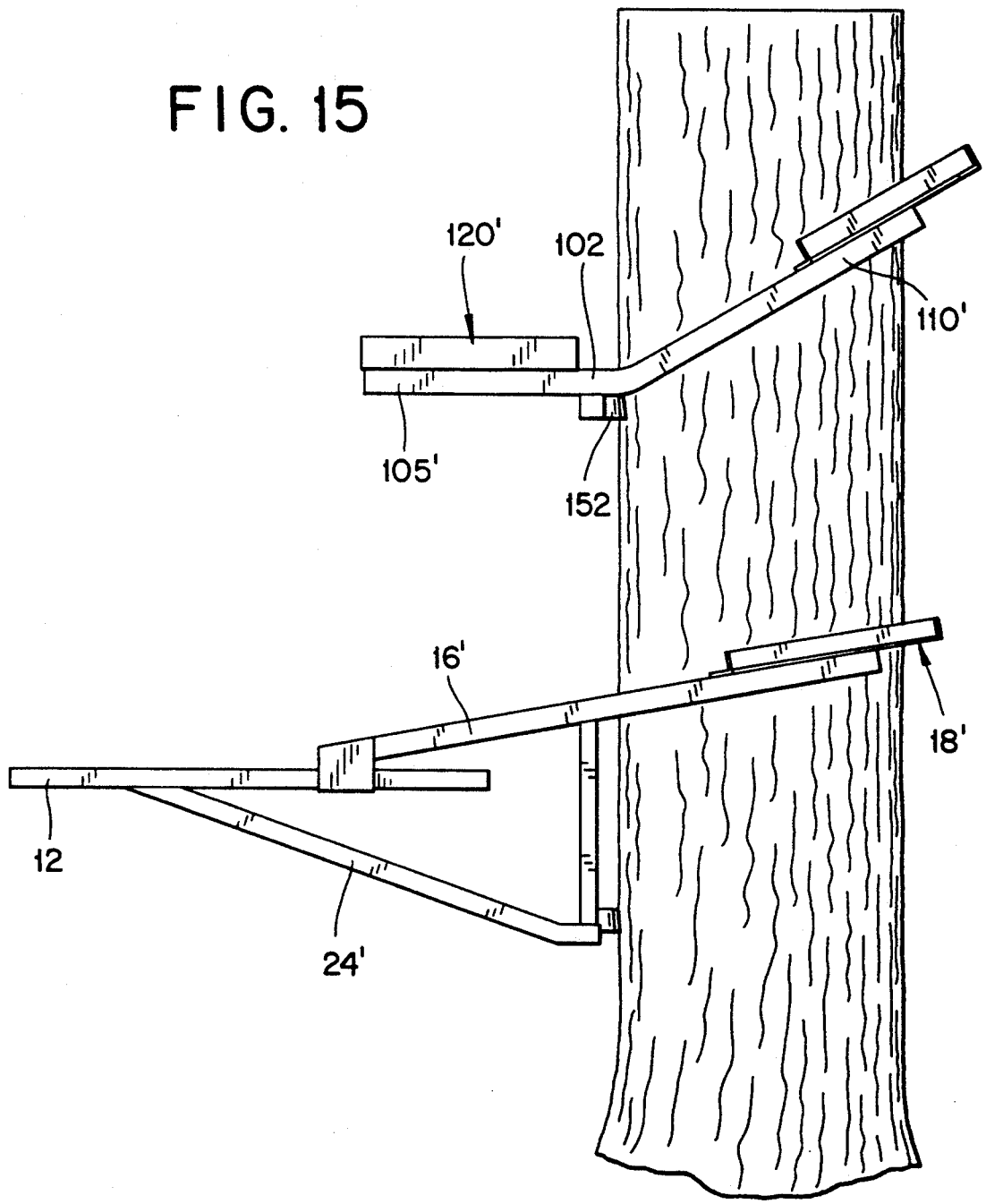

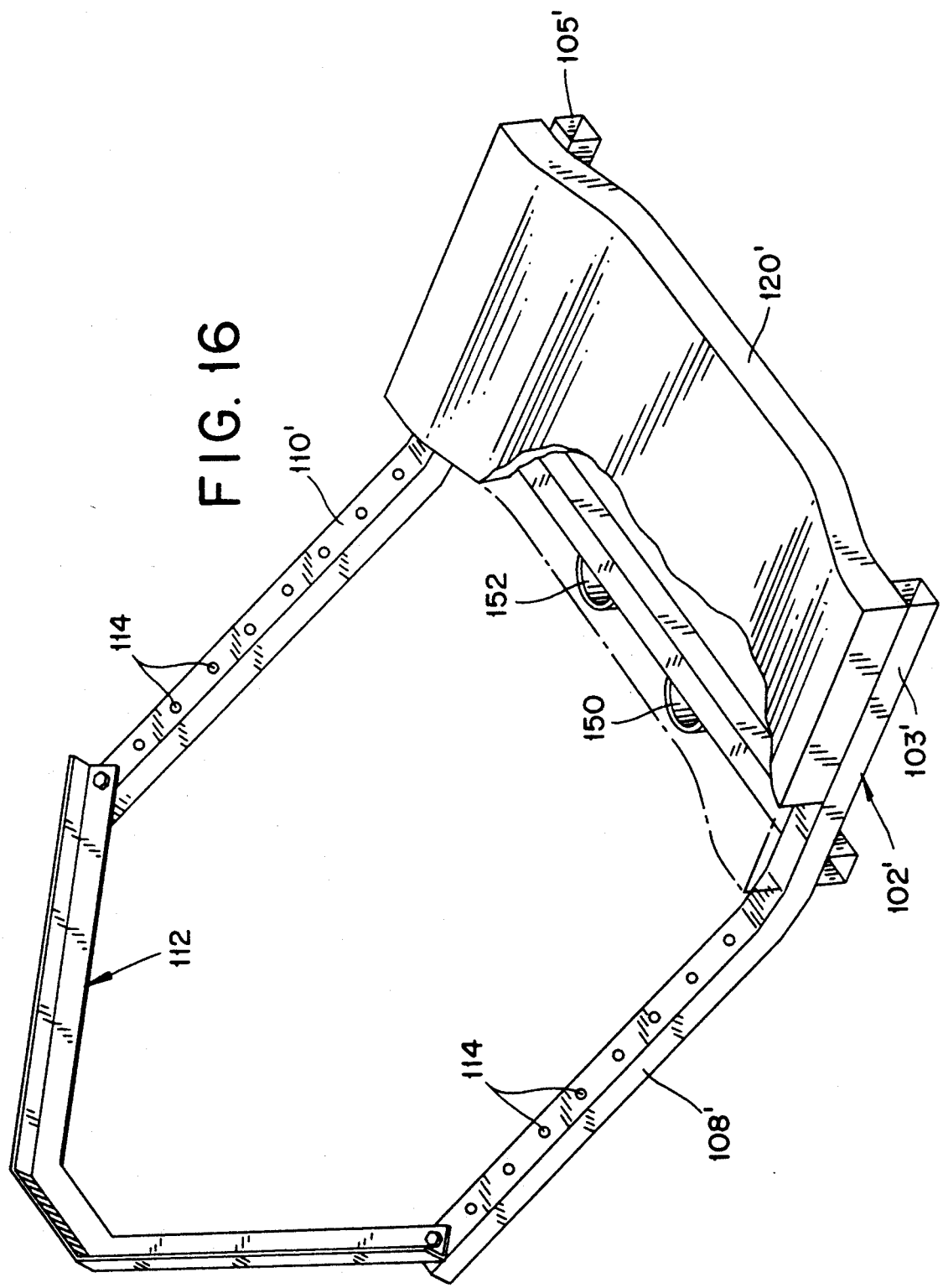

PORTABLE CLIMBING PLATFORM

BACKGROUND OF THE INVENTION

The present invention relates generally to auxiliary equipment used by active outdoorsmen. More particularly, this invention pertains to portable climbing stands used by hunters, photographers, and naturalists.

Hunters, photographers and naturalists have realized the importance of obtaining a high viewing position to avoid detection and increase their visibility of animals. There have been numerous previous patents involving a variety of construction techniques and art forms for tree climbing devices, portable tree stands, platforms, seats, and hand-held climbing devices. This invention is an improvement in user safety, adjustability, weight reduction, tree damage and comfort.

Climbing platforms are known in the prior art. See for example, U.S. Pat. No. 3,856,111 to Baker issued Dec. 24, 1974, and U.S. Pat. No. 4,168,765 to Ferguson issued Sep. 25, 1979. Those devices are generally objectionable due to the sharp edges with which they engage the tree since those edges damage the tree bark and possibly injure the health of the tree. In addition, those devices are objectionable since the user needs to be both strong and acrobatic—the user must hang from a support, support both his own weight and the weight of the platform with his arms and upper body, and while thus positioned, manipulate the platform to a new position with his feet.

The prior art has also taught use of two separate platforms, a lower one for the users feet, referred to as a foot climber, and another upper device, or stand, used to sit on. See, for example, U.S. Pat. No. 3,485,320 to Jones issued Dec. 23, 1969; U.S. Pat. No. 3,960,240 to Cotton issued Jun. 1, 1976; U.S. Pat. No. 4,137,995 to Fonte, issued Feb. 6, 1979; U.S. Pat. No. 4,230,203 to Sweat et al., issued Oct. 28, 1980; U.S. Pat. No. 4,316,526 to Amacker, issued Feb. 23, 1982; U.S. Pat. No. 4,321,983 to Nelson, issued Mar. 30, 1982; U.S. Pat. No. 4,331,216 to Amacker, issued May 25, 1982; U.S. Pat. No. 4,417,645 to Untz, issued Nov. 29, 1983; U.S. Pat. No. 4,452,338 to Untz, issued Jun. 5, 1984; U.S. Pat. No. 4,942,942 to Bradley, issued Jul. 24, 1990; and U.S. Pat. No. 4,953,662 to Porter, issued Sep. 4, 1990. Generally speaking, the prior art devices use a platform assembly which is supported from above by an upwardly inclined member that engages the tree.

In some instances, the prior art devices have also employed a flexible band or support strap and V-notch to actually engage the tree. See, for example, U.S. Pat. No. 4,427,092 to Tentler, issued Jan. 24, 1984; and U.S. Pat. No. 4,597,473 to Peck, issued Jul. 1, 1986.

The combination of a hand-held climbing device and a platform using a steel band has also been described in U.S. Pat. No. 3,955,645 to Dye, issued May 11, 1976.

Generally speaking, the known prior art devices have inclined supports extending above their standing surface but those supports present obstructions to movement of the users feet. This characteristic results in a safety hazard for the user. In addition, the known prior art devices generally require a second support from which strenuous actions are needed to manipulate a lower support using one's feet. Manipulation of a device with one's feet is an awkward and unnatural activity for most people.

None of the known prior art devices, however, provide a climbing platform which is substantially free of surface obstructions and which is supported from below by a pair of rigid triangular supports. Furthermore, none of those known prior art devices are designed with a standing platform that is narrower than the widest tree that can be climbed.

Moreover, the known prior art devices have rigid links which are adjustable longitudinally as well as laterally to accommodate trees having a girth substantially greater than the width of the climbing platform.

OBJECTS AND SUMMARY OF THE INVENTION

A general object of this invention is to provide a portable climbing stand which overcomes problems of the type associated with the prior art devices.

Another object of this invention is to provide a tree climbing apparatus having improved safety and comfort. It is always a concern when a person positions himself at an elevated location where he plans to be distracted for shooting a target, or photographing or observing wildlife in its natural habitat. Accordingly, it is important to use a safe design.

Another object is to provide a portable climbing apparatus that provides a higher strength-to-weight ratio than the prior art devices and which can be used on a broad range of tree sizes while causing little or no tree damage. Recognizing that portable climbing apparatus is likely to be carried into wooded areas, and even wilderness areas, minimization of weight is particularly important. However, it is equally important that the girth of trees which can be climbed with the device be as broad as possible.

Yet another object of this invention is to reduce tree bark damage to trees through an efficient structure utilizing a high degree of tension and compression in its component members combined with use of curved arches to apply to the tree the compressive load from the device and the person it supports. Those curved arches inherently stabilize the structure while creating a self-centering load feature.

A further object of the invention is to enhance stability against the possibility of lateral tipping of the climbing device.

These various objects are accomplished by a portable climbing device having a platform, from which a pair of side members extend to corresponding sides of a tree, and from which an angularly extending brace extends downward toward the tree. The platform and the brace combine to define a pair of rigid triangular supports beneath the platform. In addition, a connecting means, which may itself be adjustable, secures the ends of the side members together in a relationship which encircles the tree. The useable area of the platform is spaced a predetermined distance away from a tree trunk supporting the apparatus. In addition, the width of the platform is smaller than the distance between the free ends of the side members. To disengage the portable climbing device from the supporting tree trunk, for example, when adjusting its vertical location, the platform must be both lifted and tipped toward the tree trunk. Accordingly, the design prevents the user from inadvertently disengaging the platform from the tree through a simple tipping action.

The two side members may be splayed outwardly away from the platform in a non-parallel arrangement and provide improved clearance with the tree during disengagement when climbing. Alternatively, the side members may curve outwardly from the platform. Moreover, the side members have longitudinal adjustment positions to expand the caliper of trees with which the apparatus can be used. Further, the side members permit the structurally efficient use of nearly pure tension stresses in the tree engaging portions of the device, namely the side members and the adjustable connecting means. With this design arrangement only the bracing members underneath the platform are subjected to compression force loads.

To minimize damage to a growing plant such as a tree, the bracing member may have an m-shaped or double-arc configuration. With that shape, the bracing member engages or contacts the tree at two laterally spaced positions. Moreover, the adjustable connecting means may be provided with a vertically upstanding flange on each tree-engaging edge. Such flanges are effective to reduce the pressure exerted on living tree bark by the adjustable connecting means. The improved structural efficiency of the present design thus permits elimination of knife edges, spikes, blades or other grippers. Moreover, the side members and the adjustable connecting means are joined together, so as to encircle the tree, in an adjustable manner that accommodates a wide variety of tree calipers, i.e., diameters.

In a preferred embodiment, the side members may have parallel end portions. A rigid cross-member may link those side members to the supporting braces to define a pair of rigid triangular supports beneath the platform. Moreover, in that preferred embodiment, a fixed length, V-shaped connecting means extends between parallel portions of the side members to completely encircle the tree. Preferably the side members are fabricated to emanate outwardly from the platform along corresponding sides of the tree to enhance tree clearance during climbing. The rigid cross-member is operable to help support the side members thereby lowering bending stresses in the side members below the level that would occur without the cross-member.

DESCRIPTION OF THE DRAWINGS

Many other objects and advantages will be apparent to those skilled in the art when this specification is read in conjunction with the attached drawings wherein like reference numerals are applied to like elements and wherein:

FIG. 11 is a perspective view of a preferred embodiment of the portable climbing device;

FIG. 12 is an end elevational view of the portable climbing device of FIG. 11;

FIG. 13 is a plan view of the preferred embodiment of the portable climbing device of FIG. 11 encircling and engaging a tree;

FIG. 14 is a plan view of the portable climbing device of FIG. 11 encircling and engaging a tree of smaller caliper than that shown in FIG. 13;

FIG. 15 is a side elevational view of the portable climbing device of FIG. 13 in combination with an adjustable seat support; and FIG. 16 an enlarged perspective view of a preferred embodiment of the adjustable seat support according to the present invention with a portion of the seat removed to reveal the underlying structure.

DETAILED DESCRIPTION OF THE PREFERRED EMBODIMENTS

Figure 1:
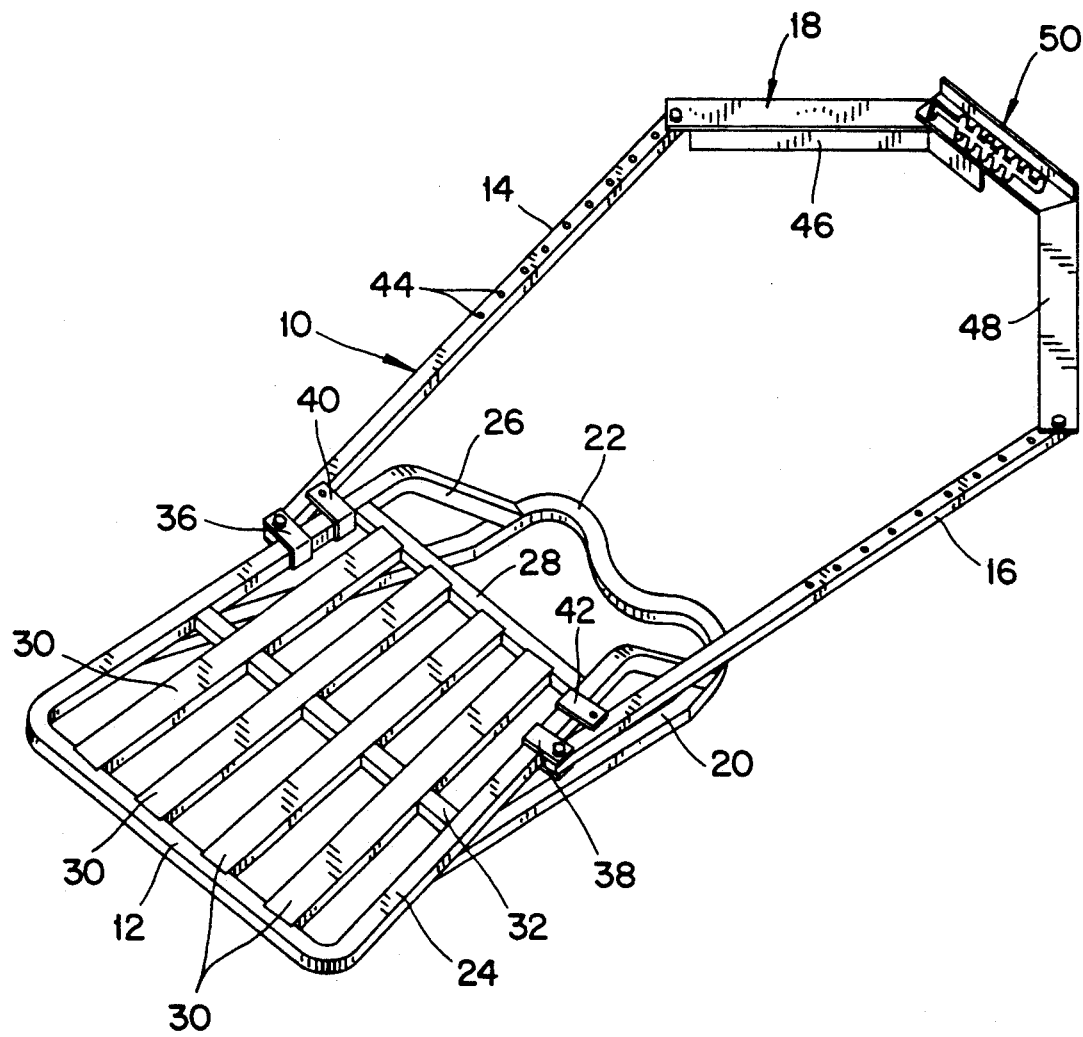
FIG. 1 is a perspective view of a portable climbing device.

The general arrangement of a portable climbing device 10 (see FIG. 1) according to the invention includes a platform assembly 12 having a pair of side members 14, 16, and a connecting member 18 extending between the pair of side members 14, 16. The connecting member 18 may, itself, be adjustable. To encircle a tree, the connecting member 18 is attached to each of the two side members 14, 16. Extending downwardly from the platform assembly 12 is a bracing member 20 having a double arch contact member 22.

The platform assembly 12 is substantially planar and is constructed and arranged so that the upper surface thereof is virtually free of any obstructions. This arrangement is significant since it reduces the likelihood that a person standing on the platform assembly 12 would catch footwear on anything, such an event could contribute to a fall. Thus, the unobstructed surface is a safety enhancement.

Where the platform assembly 12 is to be used in conjunction with a seat member, it may be desirable to outfit the assembly 12 with a pair of foot straps (not shown). Each foot strap can be secured to two of the slats 30 to provide a loop sufficiently open to receive person's shoe or boot. A suitable conventional loop length adjustment can also be provided so that the foot straps can be adjusted as snugly as desired while still accommodating a wide variety of boot sizes.

The platform assembly 12 is fabricated from a generally U-shaped frame 24 which may be made from extruded metal tubing having a substantially square cross section. Hollow tubing provides light weight along with substantial stiffness and strength. Each free end 26 of the U-shaped frame 24 is bent downwardly at an angle of about 45° to the plane of the platform assembly 12. These ends 26 are used to help position the bracing member 20, as will be described more fully below.

Extending between the free ends 26 of the U-shaped member 24 substantially parallel to the closed end of the U-shaped member 24 is a spacer bar 28. Here again, the spacer bar 28 may be fashioned from hollow extruded stock. Each end of the spacer bar 28 is suitably attached to a corresponding part of the member 24 by, for example, welding. The supporting surface of the platform assembly 12 is provided by a plurality of slats 30. Each slat 30 extends from the spacer bar 28 to the closed end of the U-shaped member 24. Conveniently, the slats 30 can be fashioned from tubular stock with a generally rectangular cross section. Preferably, each slat 30 is suitably attached by welding. It has been found that four slats 30 is convenient. That number of slats 30 provides sufficient support while leaving slots through which rain, snow, and dirt can fall to reduce the possibility of slippery conditions on the platform assembly 12. In this connection, the upper surface of the slats 30 can be treated to roughen it and reduce the likelihood of a slippery condition.

The bracing member 20 extends downwardly beneath the plane of the platform assembly 12 at an angle of about 20°-25° to the plane. The bracing member 20 has a pair of ends, each of which is attached to a corresponding side of the U-shaped has a pair of ends, each of which is attached to a corresponding side of the U-shaped member 24. To help position and properly space the bracing member 20 beneath the platform assembly 12, the ends 26 of the member 24 are suitably mattached to the bracing member 20. For example, welding is a suitable means for attachment. The bracing member 20 is also fabricated from tubular metal stock having a generally square cross section. As discussed above, that material has good strength characteristics along with light weight.

The double arch contact member 22 (see FIG. 2) has an m-shape with a pair of generally arcuate lobes connected by a generally arcuate recess 34. The arcuate recess 34 is designed with a radius that is smaller than the average radius of the smallest tree 36 which the portable climbing device 10 is intended to work with. With this feature, the double arch contact member 22 (see FIG. 3) will always contact the tree 36' at two laterally spaced positions. That arrangement for the spacing of the two arcuate lobes enhances the lateral tipping stability with which the portable climbing device 10 engages the tree 36'. As can be seen from FIG. 4, the ends 26 of the member 24, the bracing member 20, and the member 24 itself combine to present a rigid triangular support holding the double arch contact member 22 beneath the platform. Moreover, the arrangement is such that the bracing member 20 (see FIG. 1) spaces the platform assembly 12 away from the tree by a predetermined distance.

Now, the side members 14, 16 are attached to the member 24 and extend forwardly away from the platform assembly 12. The side members 14, 16 are splayed. That arrangement allows the portable climbing device 10 to be used with trees having a caliper (i.e., diameter) greater than the physical distance between the attachments of the side members 14, 16 to the member 24. Preferably, each side member 14, 16 is pivotally attached to a corresponding U-shaped bracket 36, 38 carried by the member 24 at a position adjacent to the spacer bar 28. To assure that the side members 14, 16 have at least a minimum angle therebetween, a pair of stop members 40, 42 are also carried on the member 24. The stop members 40, 42 are disposed between the corresponding bracket 36, 38 and the spacer bar 28. Each stop member 40, 42 carries a pin which is positioned to assure the side members 14, 16 do not reach a parallel condition.

Each side member 14, 16 is fabricated from bar stock and is provided with a plurality of connection holes 44. The connection holes 44 are spaced at uniform intervals along the corresponding side member 14, 16. Typical spacing between the connection holes 44 of several inches is suitable.

The side members 14, 16 can be attached to the platform assembly 12 either by a rigid connection or by a pivotal connection. If a rigid connection is selected, the side members 14, 16 are preferably welded in place. On the other hand, if a pivotal connection is selected, then a suitable fastener is to be used. A clevis pin with suitable convention retaining device is a suitable fastener. Alternatively, and without limitation, a bolt can be used having a conventional smooth shank in the area where pivotal movement will occur and having a threaded end protruding so that suitable lock nut can be applied.

The adjustable connecting means 18 is attached at one end to one of the connection holes 44 of one side member 14 and attached at its second end to one of the connection holes 44 of the second side member 16. In the embodiment of FIG. 1, the adjustable connecting means 18 has a first link 46, a second link 48, and a discretely adjustable latching means 50. Preferably, the adjustable connecting means 18 engages the tree 36 (see FIG. 2) at two spaced locations, one location being on the first link 46 and the second location being on the second link 48. To minimize damage to the tree bark, each of the links 46, 48 may be fashioned from L-shaped channel stock with one of the flanges located to be substantially vertical and parallel to the vertical extent of the tree (see position of lower flange of link 46 in FIG. 1). This arrangement allows bearing forces imposed by the portable climbing device 10 on a tree to be spread over the lateral extent of the flange, rather than concentrating those forces on a sharp edge or on a sharpened point.

While the L-shaped cross section is illustrated, it will be apparent to those skilled in the art that other cross-sectional shapes exist which will provide the same benefit. For example, square or rectangular cross sections would work equally well. In addition, a U-shaped cross section would also work. Many other cross-sectional shapes can also be envisioned that are suitable.

Figure 5:
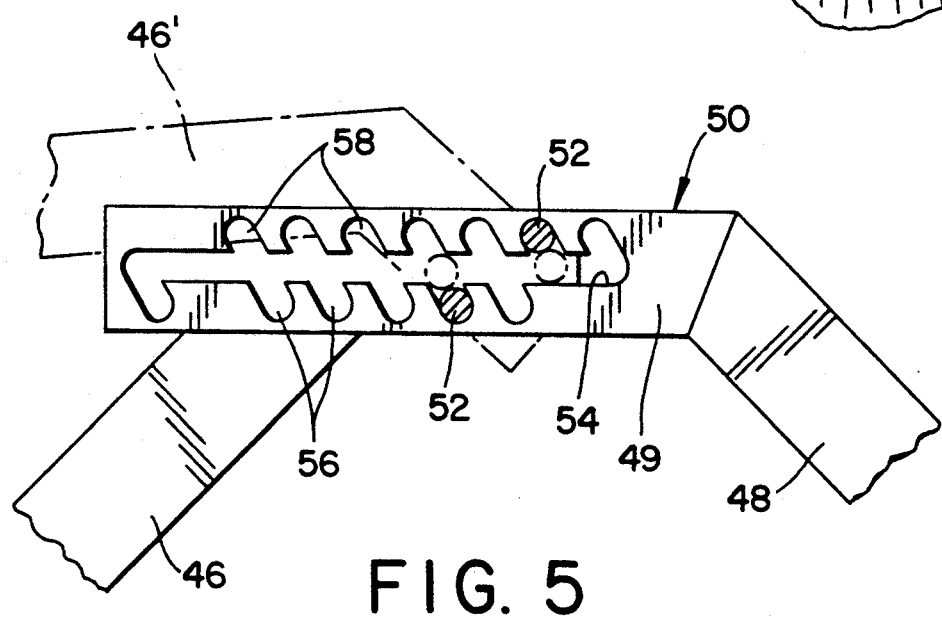
FIG. 5 is an enlarged, detail view of the adjustable connection in connecting means of FIG. 1.

Turning to FIG. 5, details of the discretely adjustable latching means 50 are illustrated. The first link 46 carries a pair of vertically upstanding pins 52 which are spaced from one another transversely of the first link 46 and spaced from one another longitudinally along the first link 46. The pins 52 can be provided with a radially enlarged top portion. In that portion 49 of the second link 48 which overlies the portion of the first link 46 having the pins 52, there is a longitudinal slot 54. The slot 54 has a first plurality of recesses 56 along one side and a second plurality of recesses 58 along the second, parallel side. The first recesses 56 are aligned with the second recesses 58; however, the axis aligning a recess 56 of the first set with a corresponding recess 58 of the second set is disposed at a predetermined angle to the longitudinal axis of the slot 54. The axis of each first recess is positioned relative to the axis of the corresponding second recess 58 so that pins 52 can be simultaneously bottomed in those recesses 56, 58. That predetermined angle corresponds to the angular rotation which is required to move the first link 46 to a second position 46' where the pins 52 move from cooperation with corresponding first and second recesses 56, 58 to a position where the pins are aligned with the slot 54.

That arrangement of the recesses 56, 58 defines the limits of adjustability between the ends of the adjustable connecting means 18. More particularly, the distance between the first and last recess of the first set of recesses 56 is the same as the distance between the first and last recess of the second set of recesses 58; that same distance is the maximum amount by which the spacing between the ends of the adjustable connecting means 18 can be increased.

The importance of the radially enlarged tops of the pins 52 can also be better appreciated now. The radially enlarged tops of the pins 52 extend beyond the transverse width of the recesses 56, 58. Accordingly, the end of the second link 48 is restrained by the pin tops from being vertically displaced from the underlying first link 46. Thus, the enlarged pin tops resist accidental disengagement of the first and second links. Moreover, the vertical clearance between the link 46 and the top of the pin can be selected to be very close to the thickness of the overlying portion of the second link 47. In that way, the pins 52 also serve to lock the two links 46, 48 into their relative positions.

It should also be noted that the cross section of the portion 49 of link 48 which overlies the pins 52 and which contains the slot 54, may have a different cross-sectional shape than the rest of the link 48. The cross section of the portion 49 must be selected so that the relative motions illustrated in FIG. 5 can be accommodated. One or more vertically upstanding flanges can be provided on the portion 49 to stiffen it as may be necessary or desirable.

Figure 2:
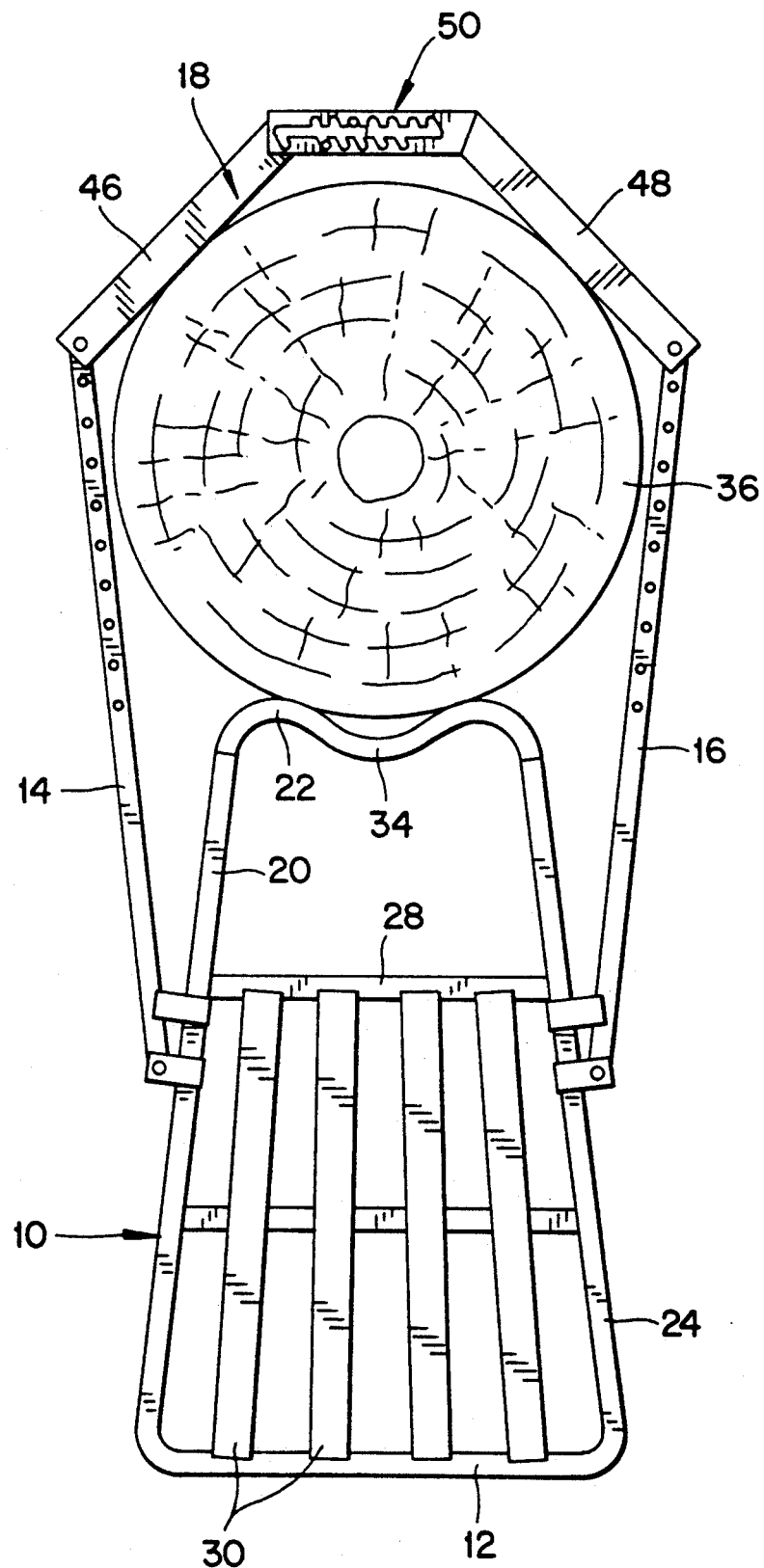
FIG. 2 is a plan view of the portable climbing device of FIG. 1 encircling and engaging a tree.
Figure 3:
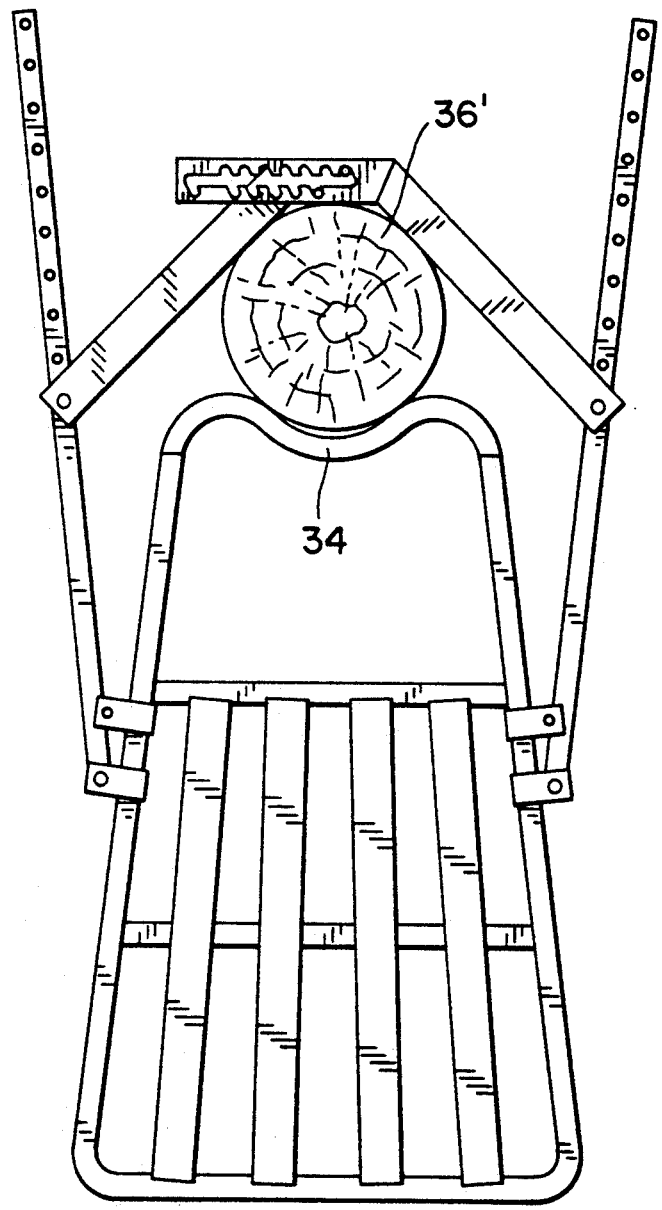
FIG. 3 is a plan view of the portable climbing device of FIG. 1 encircling and engaging a tree of smaller caliper than that shown in FIG. 2.

The importance of adjustability for the connecting means 18 and for the side members 14, 16 is best understood by comparing FIGS. 2 and 3. By adjusting the position of attachment between the connecting means 18 and the side members 14, 16, different tree calipers can be accommodated while the side members and the connecting means are subjected to nearly pure tensile loading. Moreover, by designing the latching means 50 so that it is rigid when subjected to force moments associated with tensile forces in the side members 14, 16, the latching means becomes self-tightening.

To maintain the side members 14, 16 in virtually pure tension, the adjustable connecting means 18 is connected to the adjustment hole 44 so that the tree does not touch the side members 14, 16. (See FIG. 2). When, however, the tree is small in diameter, the tensile loading of the side members 14, 16 is more easily assured. (See FIG. 3). For small tree sizes, it is important that the tree diameter be at least as great as the diameter of the connecting loop 34 of the double arched contact member in order to maintain either line contact or multiple point contact with the tree.

Figure 4:
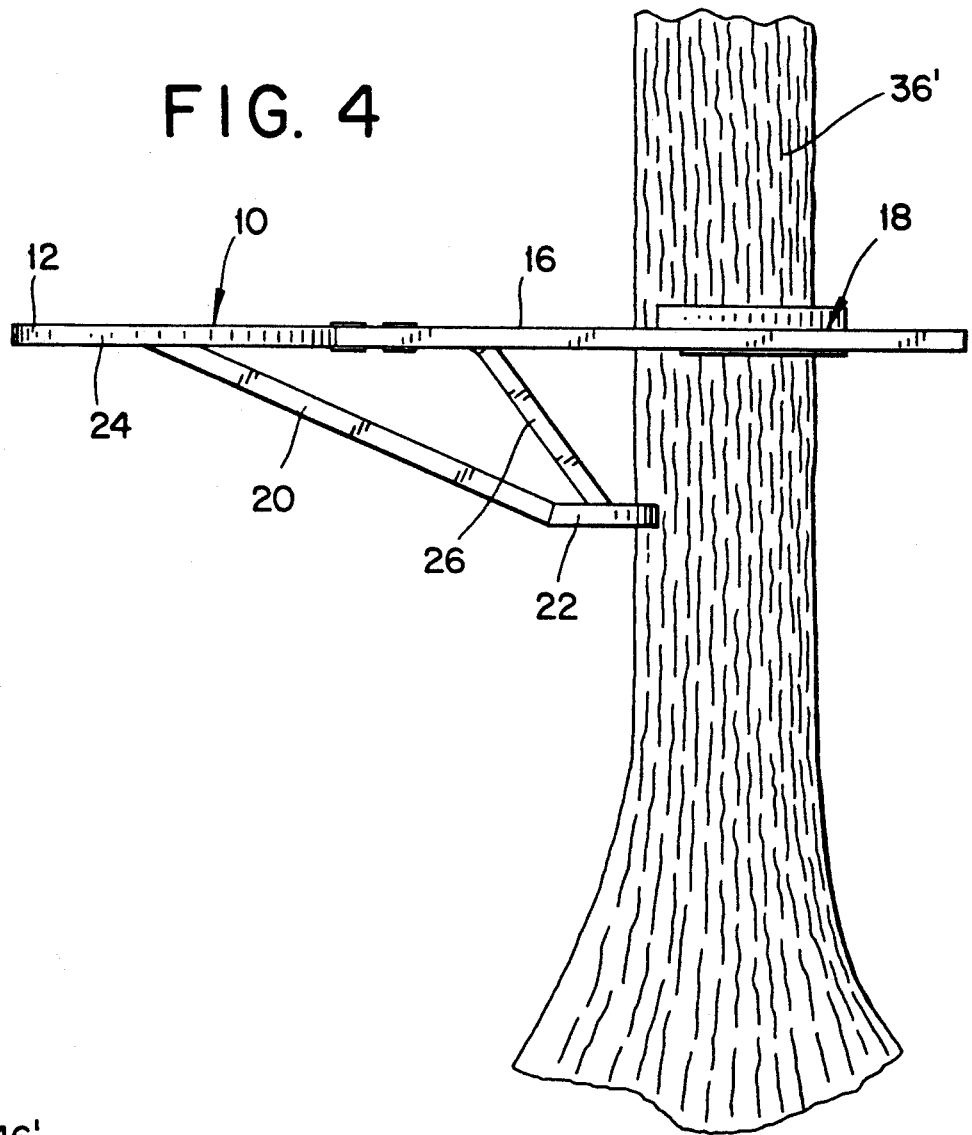
FIG. 4 is a side elevational view of the portable climbing device of FIG. 3.

The distribution of forces in the portable climbing device 10 are best understood from FIG. 4. Generally, a downward force load will be supported by the platform assembly 12 of the portable climbing device 10. That force load imposes a counterclockwise force couple on the tree 36' which is applied to the tree 36' by the adjustable connecting means 18 and the double arched contact member 22, which is spaced vertically below the platform assembly 12. As a result of the design, the side members 14, 16 are thus in virtually pure tension. The adjustable connecting means 18 is subjected to tension forces coupled with some bending forces in the plane of the platform assembly 12. The bracing member 20, however, is substantially in compression.

This arrangement of the forces in the structure allows efficient use of the material properties. More particularly, the long members such as the side members 14, 16 are in tension and do not need to be designed to accommodate buckling considerations. Thus, those members can be lighter than corresponding members in applications where compression forces are experienced. The adjustable connecting means 18 is also adapted for efficient design. By permitting the length adjustment visa the pin and slot assembly, the bending forces can be held to a lower level. Likewise, the presence of a flange adjacent the tree itself stiffens the links 46, 48 is the very direction to which bending will be applied. Accordingly, the design also efficiently reduces bending stresses in the means 18 while the means 18 is also subjected to primarily tensile loading.

Figure 6:
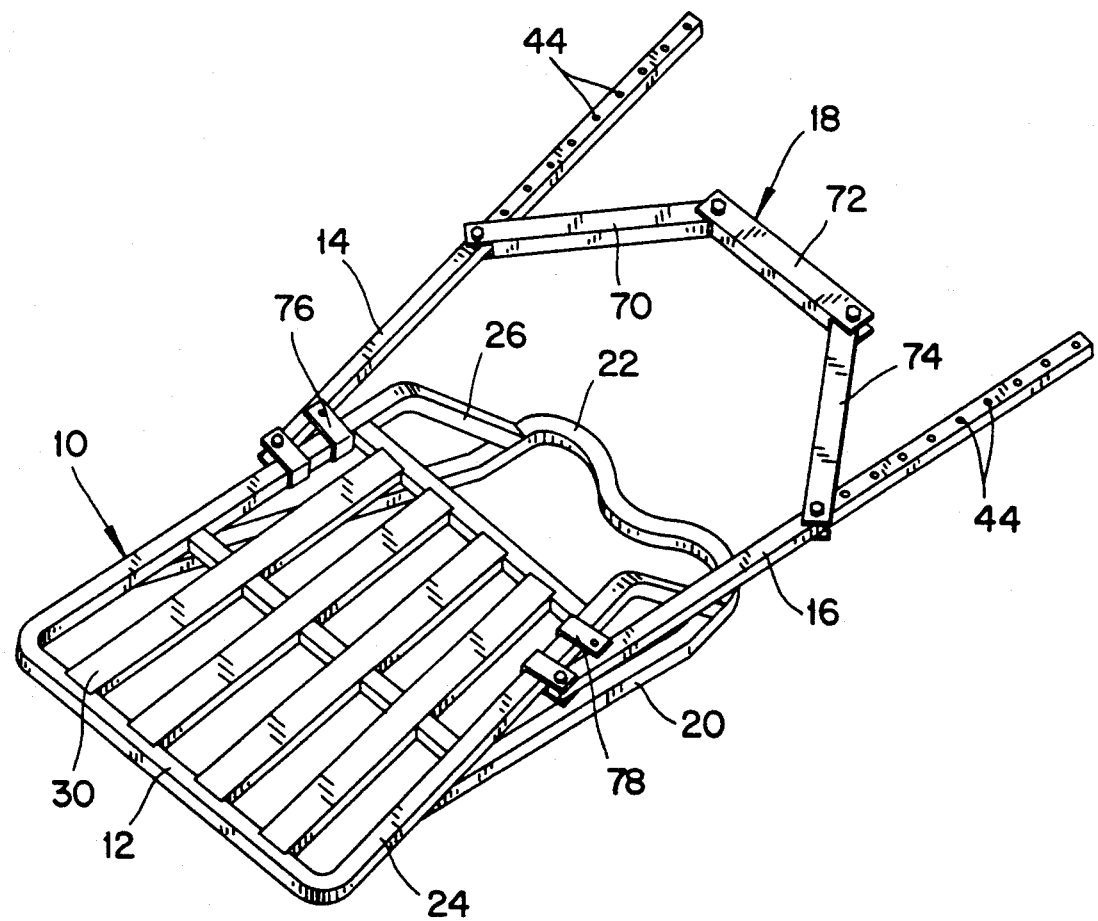
FIG. 6 is a perspective view of a second embodiment of the portable climbing device illustrating a different adjustable connection.

Other adjustable connecting means 18 can also be used with the platform assembly 12 and the side member 14, 16. For example, a second embodiment of the adjustable connecting means 18 (see FIG. 6) may include a three pivotally connected links 70, 72, 74. With this embodiment, it is preferred that the side members 14, 16 be pivotally connected to the frame 24. Stops 76, 78 carried on each side of the frame 24 are operable to guide the side members 14, 16 so that the stay in the plane of the platform assembly 12. In addition, the stops 76, 78 limit the movement of the side members 14, 16 toward the tree so that the side members maintain a splayed, non-parallel relationship to one another.

Each link 70, 72, 74 is preferably fashioned with a U-shaped cross-sectional configuration. In this manner, the surfaces of links 70, 74 which contact the tree present flat surfaces so as to minimize bark damage. In addition, the U-shaped configuration enables the use of lightweight, yet strong, links. Adjustability of this embodiment of the connecting means 18 is provided by the pivotal connections between the links 70, 72 and between the links 72, 74. Those pivotal connections enable the length between the ends of the outboard links 70, 74 to vary. Generally speaking, the pivotal arrangement between the side members 14, 16 and the frame 24 in conjunction with the pivotal connection between the links 70, 72, 74 combine to allow the climbing platform assembly 10 to be self-adjusting around trees of various caliper. The adjustment holes 44 in each of the side members 14, 16 enable the assembly 10 to be used with a wider range of tree calipers.

Figure 7:
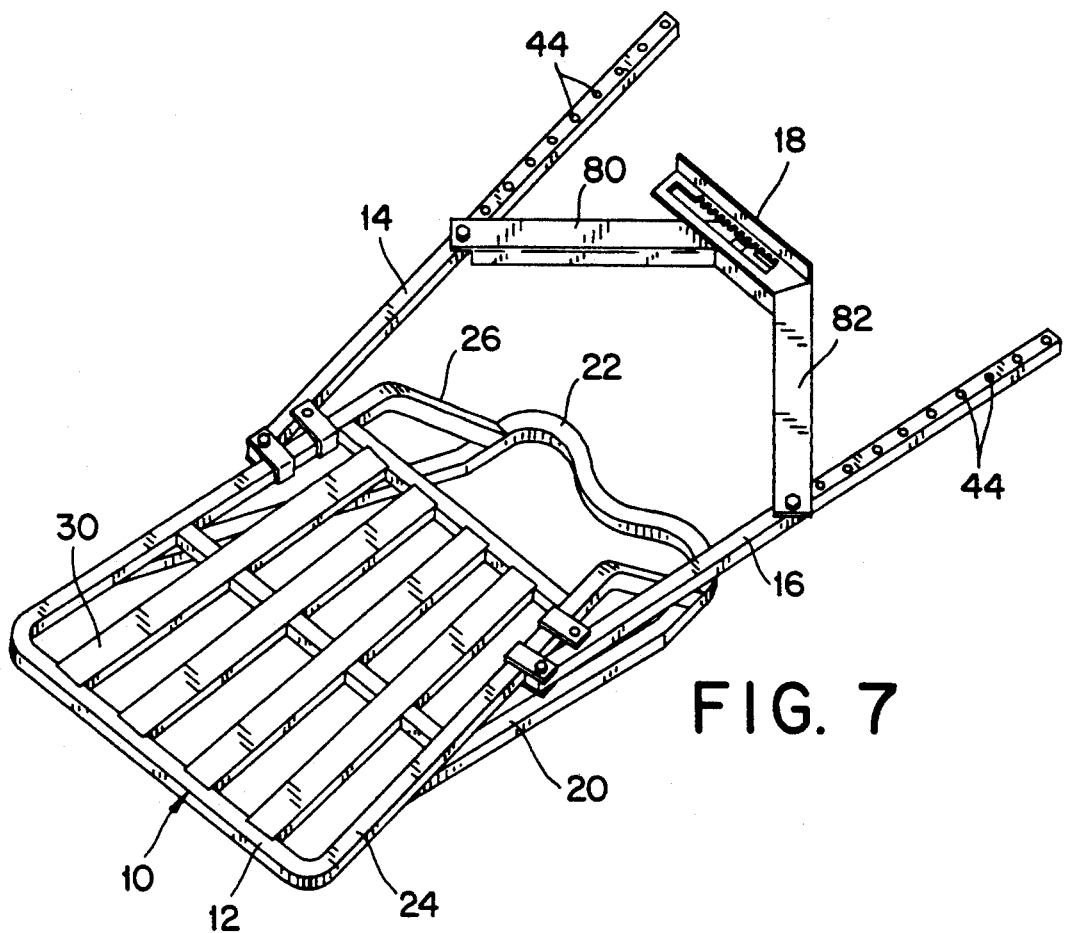
FIG. 7 is a perspective view of a third embodiment of the portable climbing device illustrating a third embodiment of the adjustable connection.
Figure 8:
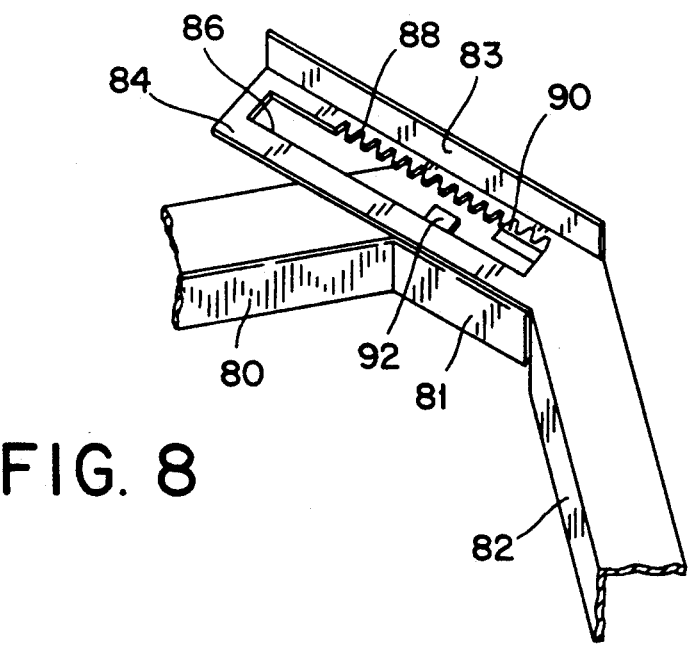
FIG. 8 is an enlarged, detail view of the adjustable connection of FIG. 7.

A third embodiment of the portable climbing assembly 10 is depicted in FIG. 7. Like FIG. 6, the difference between FIG. 7 and FIG. 1 is the detail of the adjustable connecting means 18. In this embodiment, the adjustable connecting means 18 comprises a pair of links 80, 82 (see FIG. 8) which are joined by an adjustable mechanism near their overlapping end portions. Each link 80, 82 may have an L-shaped cross-sectional configuration or other suitable cross section, both of which are discussed in more detail above. The end 84 of the second link 82 which overlies the end 81 of the first link 82 can have one or more stiffening flanges 83, as previously discussed.

In this embodiment, the end 84 of the second link 82 is provided with a longitudinal slot having a straight side portion 84 and a toothed side portion 88. Individual teeth of the toothed side portion 88 as uniformly spaced from one another. The pitch between individual teeth defines the discrete adjustments that can be accomplished with this mechanism.

To cooperate with the toothed portion of the slot, the end 81 of the first link 80 carries a toothed member 90 which extends above the horizontal surface of the end 81. In addition, the end 81 of the first link 80 carries a stop member 92 which is positioned to engage the straight side 86 of the slot when the toothed member 90 engages the toothed portion 88 thereof. As with the first embodiment, the first and second links 80, 82 can be articulated relative to one another to adjust the position of the toothed member 90 relative to the toothed portion 88, thereby adjusting the distance between the free ends of the adjustable connecting means 18.

Furthermore, to the extent desired, the toothed member 90 and the stop member 92 can be provided with top portions which overlap the end 84 of the second link 82 to prevent accidental vertical disengagement.

For those applications where the portable climbing assembly is to be used with a seat to support the user, a seat member 100 (see FIG. 9) having characteristics similar to those of the platform discussed above can be used. More particularly, the seat member 100 may include a seat support frame 102 having a three-dimensional configuration similar to that discussed abobe in connection with the climbing platform. For example, the seat support frame 102 may have a pair of generally parallel ends 103, 105, each of which is connected to a corresponding downwardly extending brace 104, 107, the braces 104, 107 being joined by a double arched contact member 106. The seat support member 102 can be fabricated from square cross-section tubing, as desired.

Each end 103, 105 of the seat support member 102 has a U-shaped clip pivotally carrying a corresponding side bar 108, 110. The side bars 108, 110, each have a plurality of longitudinally spaced adjustment holes 114, have the same characteristics as those described above in connection with the climbing platform.

Figure 9:
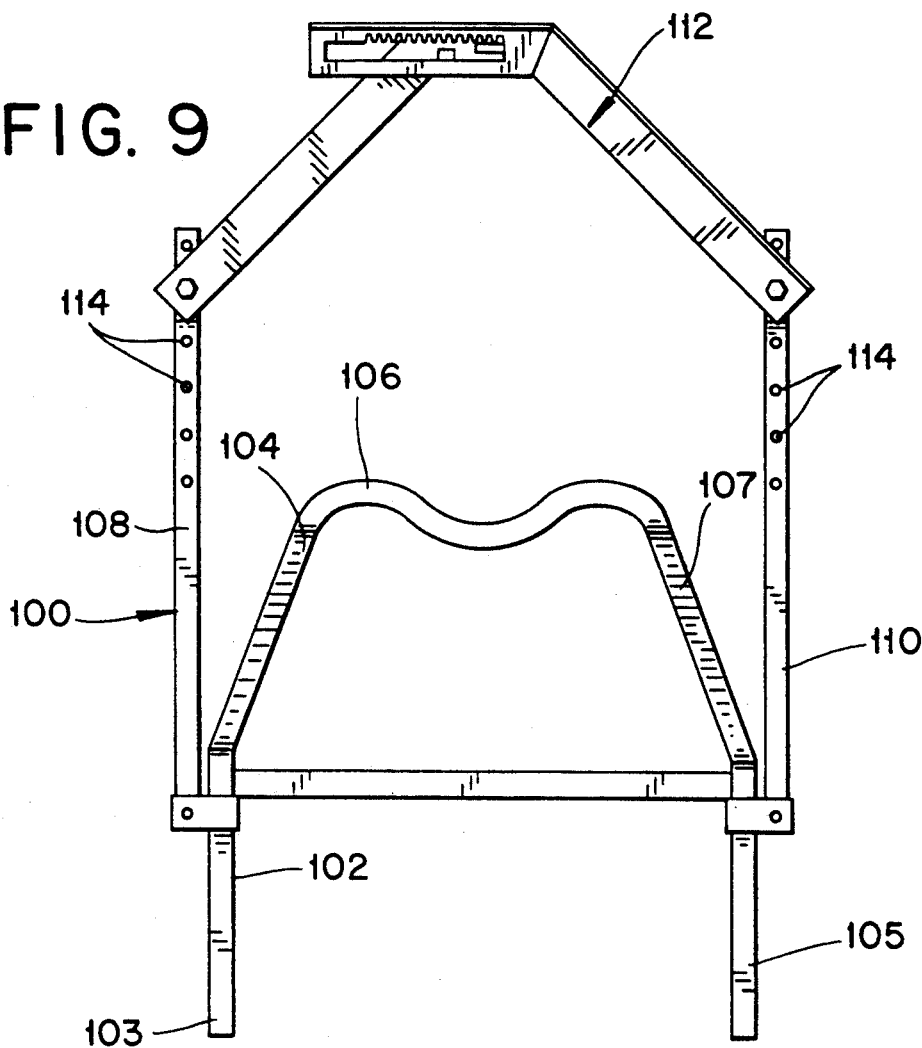
FIG. 9 is a plan view of an adjustable seat support according to the present invention.

Extending between the free ends of the side bars 108, 110 is an adjustable connecting means 112. As shown in FIG. 9 the adjustable connecting means 112 has the same features and characteristics as the third embodiment discussed above. Each of the other embodiments for the adjustable connecting means 18 (see FIGS. 1, 6, and 7) can be used in connection with the seat support, if desired. Since those various embodiments have been discussed in detail above, the descriptions will not be repeated here.

Figure 10:
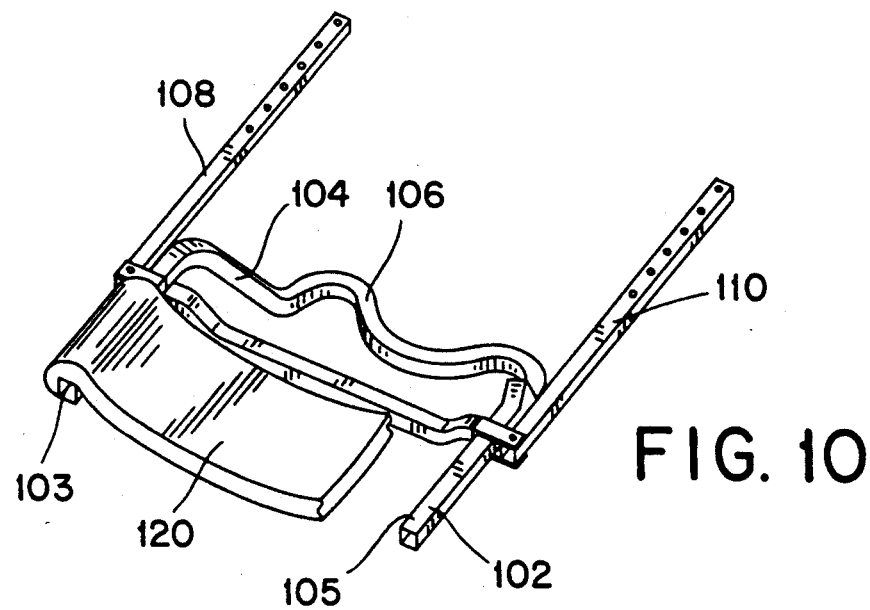
FIG. 10 is a perspective view of the adjustable seat support of FIG. 9.

Turning now to FIG. 10, a suitable conventional flexible seat member 120 can be conventionally attached to each end 103, 105 of the seat support member 102.

When both the seat member 100 and the portable climbing assembly 10 are used together, the seat member 100 can support the user's weight while the climbing assembly 10 gives a foot support and/or foot rest.

THE MOST PREFERRED EMBODIMENT

The general arrangement of a portable climbing device 10 (see FIG. 11) according to the most preferred embodiment of the invention includes a platform assembly 12 having a pair of side members 14', 16' and a fixed length connecting member 18' extending between the pair of side members 14', 16'. The connecting member 18' is generally V-shaped, having a pair of links 46', 48' connected by a short intermediate portion 47'. The connecting member 18' is designed to contact the tree at a pair of contact points.

To encircle a tree, the connecting member 18' is attached to each of the two side members 14', 16'. Extending downwardly from the platform assembly 12 are two identical bracing members 24', 26' which are fastened to a cross supporting member 130 to which two arch supports 132, 134 are affixed that provide self-centering contact with the tree. For example, welding is a suitable means for attaching the bracing members 24', 26' to the cross supporting member 130.

The platform assembly 12 is substantially planar and is constructed and arranged so that the upper surface thereof is virtually free any obstructions. This arrangement reduces the likelihood that a person standing on the platform assembly 12 would catch footwear on anything, such an event could contribute to a fall. Thus, the reduced surface obstruction is a safety enhancement.

Where the platform assembly 12 is to be used in conjunction with a seat member, it may be desirable to outfit the assembly 12 with a pair of foot straps 136, 138. The foot straps can be fabricated from any suitable conventional flexible material including, by way of example, leather, nylon webbing, and the like. Each foot strap 136, 138 can be secured to two of the slats 30 to provide a loop sufficiently open to receive a person's shoe or boot. A suitable conventional loop length adjustment (not shown) can also be provided so that the foot straps can be adjusted as snugly as desired while still accommodating a wide variety of boot sizes.

The platform assembly 12 is fabricated to form a closed generally rectangular frame. The frame may be made from extruded metal tubing having a substantially square cross section. Hollow tubing provides light weight along with substantial stiffness and strength. The mating ends of the closed platform assembly 12 are welded to form the closed, continuous tubing frame. The lateral width of the platform assembly 12 is selected to be less than the distance between the ends of the side members 14', 16' to enhance stability against lateral tipping. Between the side members 14', 16' is a lateral supporting member 130 which provides a rigid link between the side members 14', 16' and the supporting braces 24', 26'.

The supporting surface of the platform assembly 12 is provided by a plurality of slats 30. Each slat 30 extends longitudionally across the platform assembly 12. Conveniently, the slats 30 can be fashioned from channel or tubular stock with a generally rectangular cross section. Preferably, each slat 30 is suitably attached to the frame, as by welding. It has been found that four slats 30 is convenient. That number of slats 30 provides sufficient support while leaving slots through which rain, snow, and dirt can fall to reduce the possibility of slippery conditions on the platform assembly 12. In this connection, the upper surface of the slats 30 can be treated to roughen it and reduce the likelihood of a slippery condition.

The bracing members 24', 26' extend downwardly beneath the plane of the platform assembly 12 at an angle of about 20° to the plane of the frame. Each of the bracing members 24', 26' is attached to a corresponding side of the closed platform assembly 12. For example, welding is a suitable means for attachment. The bracing members 24', 26' are also fabricated from tubular metal stock having a generally square cross section. As discussed above, that material has good strength characteristics along with light weight.

The cross supporting member, or rigid link 130 has a pair of arched contact members 132, 134 (see FIG. 11) spaced from one another by a predetermined distance and being centered along the cross supporting member 130. This spacing is selected to maintain sufficient contact with a tree having a radius at least as large as the smallest tree with which the portable climbing device 10 is intended to work. With this feature, the pair of contact members 132, 134 (see FIG. 13) will always contact the tree 36' at two laterally spaced positions.

That arrangement for the spacing of the pair of arch members 132, 134 enhances the lateral stability of the platform when the portable climbing device 10 engages the tree 36'.

As can be seen from FIG. 14, the side members 14', 16', the bracing members 24', 26', and the cross supporting member 130 combine to form a rigid triangular support holding the pair of arched contact members 132, 134 in proper position beneath the platform. Moreover, the arrangement is such that the bracing members 24', 26' (see FIG. 11) space the platform assembly 12 away from the tree by a predetermined distance.

Now, the side members 14', 16' are rigidly attached to the platform assembly 12 and extend forwardly away from the platform assembly 12. Each side member 14', 16' is fabricated with a corresponding parallel portion 140, 142 and an S-curved portion that laterally offsets the parallel portions from sides of the platform 12. The parallel relationship of the portions 140, 142 is operable to maintain constant spacing between the adjustment holes 44 and for attachment of the connecting means 18' to the platform assembly 12. That arrangement allows the portable climbing device to be used with trees having a caliper (i.e. diameter) greater than the physical distance between the attachments of the side members 14', 16' to the platform assembly 12, i.e., wider than the platform itself. Preferably, each side member 14', 16' is rigidly attached to the peripheral frame of the platform assembly 12.

Each side member 14', 16' is fabricated fro tubing stock and is provided with a plurality of connection holes 44. The connection holes 44 are spaced at uniform intervals along the corresponding side member 14', 16'. Typical spacing between the connection holes 44 of several inches is suitable.

The connecting means 18' is attached at one end to one of the connection holes 44 of one side member 14' and attached at its second end to one of the connection holes 44 of the second side member 16'. In the embodiment of FIG. 11, the connecting means 18' engages the tree 36 (see FIG. 13) at two spaced locations, one location being on the first link 46' and the second location being on the second link 48'. To minimize damage to the tree bark, each link 46', 48' may be fitted with a protective cover (not shown) to increase the radius of the edge of the link which contacts the tree. This arrangement allows bearing forces imposed by the portable climbing device 10 on a tree to be spread over the lateral extent of the protective cover, rather than concentrating those forces on a sharp edge or a sharpened point.

While the L-shaped cross section is illustrated, it will be apparent to those skilled in the art that other cross-sectional shapes exist which will provide the same benefit. For example, square or rectangular cross sections would work equally well. In addition, a U-shaped cross section would also work. Many other cross-sectional shapes can also be envisioned that are suitable.

To maintain the side members 14', 16' in virtually pure tension, the connecting means 18' is attached to the adjustment holes 44 so that the tree does not touch the side members 14', 16'. (See FIG. 13). When, however, the tree 36' is small in diameter, the tensile loading of the side members 14', 16' is more easily assured. (See FIG. 14). For small tree sizes, it is important the that the tree diameter be large enough to maintain multiple point contact with either the connecting means 18' or with the cross member 130. Accordingly, the adjustment holes 44 are sufficient to only allow adjustment to trees large enough to maintain this criteria. (See FIG. 14).

The distribution of forces in the portable climbing device 10 are best understood from FIG. 15. Generally, a downward force load will be supported by the platform assembly 12 of the portable climbing device 10. That force load imposes a counterclosckwise force couole on the tree 36' which is applied to the tree 36' by the connecting means 18 and the pair of arched contact members 132, 134, which are spaced vertically below the platform assembly 12. As a result of the design, the side members 14', 16' are thus in virtually pure tension. The connecting means 18' is subjected to tension forces coupled with some bending forces in the plane of the side member 14', 16'. The bracing members 24', 26', however, are substantially in compression. This arrangement of the forces in the structure allows efficient use of the material properties. More particularly, the long members such as the side members 14', 16' are substantially supported from bending loads by the cross member 130. Thus, those members can be lighter than corresponding members in applications where compression forces are experienced.

The connecting means 18' is also adapted for efficient design. The presence of a flange opposite the tree itself stiffens the links 46, 48 in the very direction to which bending will be applied. Accordingly, the design also efficiently reduces bending stresses in the connecting means 18' while the connecting means 18' is also subjected to primarily tensile loading.

For those applications where the portable climbing assembly is to be used with a seat to support the user, a seat member 120' (see FIG. 15) having characteristics similar to those of the platform discussed above can be used. More particularly, the seat member 120' (see FIG. 16) may include a seat support frame 102' having generally parallel ends 103', 105', each of which is connected to a corresponding perpendicular cross brace. The pair of arched contact members 150, 152, similar to those of the platform discussed above can be used. The seat support frame 102' can be fabricated from square cross-section tubing, as desired.

Each end 108', 110' of the seat support members 103', 105', has a plurality of longitudinally spaced adjustment holes 114, having the same characteristics as those described above in connection with the climbing platform.

Extending between the free ends of the seat support members 103', 105', is a connecting means 112. As shown in FIG. 16 the connecting means 112 has the same features and characteristics as the most preferred embodiment discussed above. Each of the other connecting means embodiments discussed in detail above can be used with this seat support member, but those descriptions will not be repeated here.

A suitable conventional flexible seat pad member 120' can be conventionally attached to each end of 103', 105' of the seat support member 102'.

When both the seat member 100 and the portable climbing assembly 10 are used together, the seat member 100 can support the users weight while the climbing assembly 10 gives a foot support and/or foot rest.

With the various embodiments discussed above, a suitable material is medium carbon alloy steel tubing with a 13/16" square cross section and an 18 gauge wall thickness.

OPERATION

Having now described the various features of the various embodiments of the portable climbing device and the seat support, it is convenient to describe the manner in which these devices are used.

When an outdoorsman identifies a tree that he desires to use for an elevated support platform, he positions the portable climbing assembly 10 (FIG. 1) with the side members 14, 16 positioned on opposite sides of the tree. To open the portable climbing assembly 10 for the tree, the adjustment mechanism 50 can be opened by disengaging the pins from their recesses and lifting one link 48 off of the other link 46. Alternatively, one of the pivotal connections at the ends of the adjustment means 18 can be removed so that the whole adjustment means 18 swings open. Preferably, however, the adjustment means 18 will be detached from the ends of the side member 14, 16 so that the climbing assembly can be positioned around the tree. This approach is preferred since the length of the connecting means 18 can then be set with the adjustment 50 and the connecting means 18 can be attached in appropriate holes 44 of the side members 14, 16.

When the connecting member 18 is adjusted for the size of the tree at the beginning of a climb, the platform assembly may be inclined so that in slopes downwardly toward the tree. That initial slope will accommodate for reductions in tree diameter at higher locations so that the platform assembly 12 will ultimately be approximately level or horizontal.

To move the portable climbing device 10 up the tree 36' (see FIG. 4) the free end of the platform assembly 10 is tilted toward the tree 36' releasing contact with the adjustable connecting means 18. Then, the whole device 10 is lifted a discrete distance up the tree so that the double arched contact member 22 engages the tree at a higher position. When the front edge of the climbing device 10 is then released, the device 10 grips the tree at the new, higher location.

Those steps are repeated as many times as desired until the climbing device 10 is as high as desired.

In some instances, it will be desired for the user to either have a seat or to have an auxiliary member to assist the tree climbing exercise. For such situations, the seat support member (see FIG. 9) can be used in conjunction with the climbing device. When these devices are used in combination with each other, the climbing device 10 is initially positioned in the manner described above. Thereafter, standing on the climbing device, the seat support member 100 is attached to the tree in the same manner as the climbing device had been attached thereto. Generally, the seat support member 100 will be positioned such that the climbing device 10 can be reached from the seat support member 100. With that vertical spacing, the user can support his chest on the seat support member 100, while tipping and lifting the climbing device to a higher position. Then, standing on the climbing device, the seat support member 100 can be repositioned to a higher elevation. Those steps are repeated until the climbing device is at the desired elevation.

Then, the seat support member 100 is positioned to provide a comfortable sitting position and the apparatus is in position for use.

The foregoing steps can be reversed to walk the portable climbing device down the tree, whether the seat support is also used or not.

OPERATION OF THE MOST PREFERRED EMBODIMENT

Operation of the preferred embodiment is substantially the same but will be described here for completeness. When an outdoorsman identifies a tree that he desires to use for an elevated position, he positions the portable climbing assembly 10 (FIG. 11) with the side members 14', 16', positioned on opposite sides of the tree. To open the portable climbing assembly 10 for the tree, one of the pivotal connections at the ends of the connecting means 18' can be disconnected from either of the side members 14', 16' so that the whole connecting means 18' swings open. If the identified tree is has a diameter sufficiently different from the previously climbed tree, it may be necessary to disconnect and reposition both ends of the connecting member 18' for proper adjustment.

When the connecting member 18' is adjusted for the size of the tree at the beginning of a climb, the platform assembly may be inclined so that it slopes downwardly toward the tree. That initial slope will accommodate for reductions in tree diameter at higher locations so that the platform assembly 12 will ultimately be approximately level or horizontal when the desired height is achieved.

To move the portable climbing device 10 up the tree 36' (see FIG. 15) the free end of the platform assembly 10 is tilted toward the tree 36' releasing contact with the adjustable connecting means 18'. Then, the whole device 10 is lifted a discrete distance up the tree so that the pair of arched contact members 132, 134 engage the tree at a higher position. When the front edge of the climbing device 10 is then released, the device 10 grips the tree at the new, higher location.

Those steps are repeated as many times as desired until the climbing device 10 is as high as desired.

In some instances, it will be desired for the user to either have a seat or to have an auxiliary member to assist the tree climbing exercise. For such situations, the seat support member (see FIG. 16) can be used in conjunction with the climbing device. When these devices are used in combination with each other, the climbing device 10 is initially positioned in the manner described above. Thereafter, standing on the climbing device, the seat support member 100 is attached to the tree in the same manner as the climbing device had been attached thereto. Generally, the seat support member 100 will be positioned such that the climbing device 10 can be reached from the seat support member 100. With that vertical spacing, the user can support his chest on the seat support member 100, while tipping and lifting the climbing device to a higher position. Then, standing on the climbing device, the seat support member 100 can be repositioned to a higher elevation. Those steps are repeated until the climbing device is at the desired elevation.

Then the seat support member 100 is positioned to provide a comfortable sitting position and the apparatus is in position for use.

The foregoing steps are reversed to walk the portable climbing device down the tree, whether the seat support 100 is also used or not.

It should now be apparent to those skilled in the art that a new and improved portable climbing device has been described. It will also be apparent to those skilled in the art that numerous modifications, variations, substitutions, and equivalents exist for elements of the invention which do not materially depart from the spirit and scope of the invention. Accordingly, it is expressly intended that all such modifications, variations, substitutions, and equivalents which fall within the spirit and scope of the invention as defined by the appended claims be embraced thereby.

What is claimed is:

1. A tree climbing apparatus comprising:
   platform means having sides, for supporting the weight of a person;
   a pair of splayed side members, one end of each side member connected to a corresponding side of platform means so as to be moveable in the plane of the platform means, each side member having a plurality of spaced adjustment holes;
   a connecting means pivotally attached to an adjustment hole in each of the side members, having at least two rigid links and two ends, and operable such that the distance defined between the two ends can be varied;
   a bracing member attached to and positioned below the platform means and defining a tree contacting surface; and
   a pair of triangular supports for the platform means, one side being defined by part of the platform means, a second side being defined by the bracing member.

2. The tree climbing apparatus of claim 1 wherein the connecting means includes a pair of rigid links.

3. A tree climbing apparatus comprising:
   platform means having sides, for supporting the weight of a person:
   a pair of splayed side members, one end of each side member connected to a corresponding side of platform means, each side member having a plurality of spaced adjustment holes:
   a connecting means pivotally attached to an adjustment hole in each of the side members, having at least two rigid links and two ends, and operable such that the distance defined between the two ends can be varied:
   a bracing member attached to and positioned below the platform means and defining a tree contacting surface:
   a pair of triangular supports for the platform means, one side being defined by part of the platform means, a second side being defined by the bracing member:
   wherein the connecting means includes a pair of rigid links: and
   wherein each rigid link includes a substantially flat surface positioned for surface-to-surface contact with a tree.

4. A tree climbing apparatus comprising:
   platform means having sides, for supporting the weight of a person:
   a pair of splayed side members, one end of each side member connected to a corresponding side of platform means, each side member having a plurality of spaced adjustment holes:
   a connecting means pivotally attached to an adjustment hole in each of the side members, having at least two rigid links and two ends, and operable such that the distance defined between the two ends can be varied:
   a bracing member attached to and positioned below the platform means and defining a tree contacting surface:
   a pair of triangular supports for the platform means, one side being defined by part of the platform means, a second side being defined by the bracing member:
   wherein the connecting means includes a pair of rigid links: and
   wherein the connecting means includes a third rigid link, pivotally connected to each link of the pair of links, and cooperating with the pair of links to define a variable-length connection between side members.

5. A tree climbing apparatus comprising:
   platform means having sides, for supporting the weight of a person;
   a pair of splayed side members, one end of each side member connected to a corresponding side of platform means, each side member having a plurality of spaced adjustment holes;
   a connecting means pivotally attached to an adjustment hole in each of the side members, having at least two rigid links and two ends, and operable such that the distance defined between the two ends can be varied;
   a bracing member attached to and positioned below the platform means and defining a tree contacting surface;
   a pair of triangular supports for the platform means, one side being defined by part of the platform means, a second side being defined by the bracing member;
   wherein the connecting means includes a pair of rigid links;
   wherein one of the pair of links has a pair of upstanding pins; and
   wherein the other of the pair of links has a longitudinally extending slot, the slot having opposed, pin-receiving recesses along the length thereof, those recesses cooperating with the upstanding pins to fix the length of the pair of links at one of a plurality of discrete values.

6. A tree climbing apparatus comprising:
   platform means having sides, for supporting the weight of a person;
   a pair of splayed side members, one end of each side member connected to a corresponding side of platform means, each side member having a plurality of spaced adjustment holes;
   a connecting means pivotally attached to an adjustment hole in each of the side members, having at least two rigid links and two ends, and operable such that the distance defined between the two ends can be varied;
   a bracing member attached to and positioned below the platform means and defining a tree contacting surface;
   a pair of triangular supports for the platform means, one side being defined by part of the platform means, a second side being defined by the bracing member;
   wherein the connecting means includes a pair of rigid links;
   wherein one of the pair of links has a toothed member and a stop member, each of the toothed member and the stop member projecting from the surface of the one link; and
   wherein the other of the pair of links having a slot, one side portion of the slot having a toothed configuration conforming to the shape of the teeth on the toothed member, and another side of the slot having a straight portion, the toothed member engaging the toothed portion of the slot and the stop member engaging the straight side of the slot, whereby the length of the pair of rigid links can be fixed at one of a plurality of discrete values.

7. A tree climbing apparatus comprising:
platform means having sides, for supporting the weight of a person;
a pair of splayed side members, one end of each side member connected to a corresponding side of platform means so as to be moveable in the plane of the platform means, each side member having a plurality of spaced adjustment holes;
an adjustable connecting means pivotally attached to an adjustment hole in each of the side members, having at least two rigid links and two ends, and operable such that the distance defined between the two ends can be varied;
a bracing member attached to the platform means and defining a tree contacting surface, the bracing member having an end portion spaced below the platform.

8. The tree climbing apparatus of claim 7 wherein the adjustable connecting means includes a pair of rigid links.

9. The tree climbing apparatus of claim 7 wherein the bracing member includes a double arc contact surface portion, the double arc contact surface portion having a pair of protruding arc sections joined by a concave arc portion, the concave arc portion defining the minimum caliper tree suitable for use with the apparatus.

10. The tree climbing apparatus of claim 7 wherein the platform means is spaced from the tree contacting surface of the bracing member by a predetermined distance.

11. The tree climbing apparatus of claim 7 wherein the side members are attached to the platform means with a pivotal connection so that the side members can accommodate adjustable connecting means of different lengths.

12. A tree climbing apparatus comprising:
platform means having sides, for supporting the weight of a person;
a pair of splayed side members, one end of each side member connected to a corresponding side of platform means, each side member having a plurality of spaced adjustment holes;
an adjustable connecting means pivotally attached to an adjustment hole in each of the side members, having at least two rigid links and two ends, and operable such that the distance defined between the two ends can be varied;
a bracing member attached to the platform means and defining a tree contacting surface, the bracing member having an end portion spaced below the platform.
wherein the adjustable connecting means includes a pair of rigid links; and
wherein each rigid link includes a substantially flat surface positioned for surface-to-surface contact with a tree.

13. A tree climbing apparatus comprising:
platform means having sides, for supporting the weight of a person;
a pair of splayed side members, one end of each side member connected to a corresponding side of platform means, each side member having a plurality of spaced adjustment holes;
an adjustable connecting means pivotally attached to an adjustment hole in each of the side members, having at least two rigid links and two ends, and operable such that the distance defined between the two ends can be varied;
a bracing member attached to the platform means and defining a tree contacting surface, the bracing member having an end portion spaced below the platform.
wherein the adjustable connecting means includes a pair of rigid links; and
wherein the adjustable connecting means includes a third rigid link, pivotally connected to each link of the pair of links, and cooperating with the pair of links to define a variable-length connection between side members.

14. A tree climbing apparatus comprising:
platform means having sides, for supporting the weight of a person;
a pair of splayed side members, one end of each side member connected to a corresponding side of platform means, each side member having a plurality of spaced adjustment holes;
an adjustable connecting means pivotally attached to an adjustment hole in each of the side members, having at least two rigid links and two ends, and operable such that the distance defined between the two ends can be varied;
a bracing member attached to the platform means and defining a tree contacting surface, the bracing member having an end portion spaced below the platform.
wherein the adjustable connecting means includes a pair of rigid links
wherein one of the pair of links has a pair of upstanding pins; and
wherein the other of the pair of links has a longitudinally extending slot, the slot having opposed, pin-receiving recesses along the length thereof, those recesses cooperating with the upstanding pins to fix the length of the pair of links at one of a plurality of discrete values.

15. A tree climbing apparatus comprising:
platform means having sides, for supporting the weight of a person;
a pair of splayed side members, one end of each side member connected to a corresponding side of platform means, each side member having a plurality of spaced adjustment holes;
an adjustable connecting means pivotally attached to an adjustment hole in each of the side members, having at least two ends, and operable such that the distance defined between the two ends can be varied;
a bracing member attached to the platform means and defining a tree contacting surface, the bracing member having an end portion spaced below the platform.
wherein the adjustable connecting means includes a pair of rigid links
wherein one of the pair of links has a toothed member and a stop member, each of the toothed member and the stop member projecting from the surface of the one link; and
wherein the other of the pair of links having a slot, one side portion of the slot having a toothed configuration conforming to the shape of the teeth on the toothed member, and another side of the slot having a straight portion, the toothed member engaging the toothed portion of the slot and the stop member engaging the straight side of the slot, whereby the length of the pair of rigid links can be fixed at one of a plurality of discrete values.

16. A tree stand for use in combination with a vertical columnar member such as a tree comprising:
   a base support means supported on the vertical columnar member including:
      platform means having a pair of opposed sides,
      a pair of splayed side members, one end of each side member connected to a corresponding side of platform means so as to be moveable in the plane of the platform means, each side member having a plurality of spaced adjustment holes,
      an adjustable connecting means pivotally attached to an adjustment hole in each of the side members, having at least two rigid links and two ends, and operable such that the distance defined between the two ends can be varied,
      a bracing member attached to the platform means and defining a tree contacting surface, and
      a pair of triangular supports for the platform means, one side being defined by part of the platform means, a second side being defined by the bracing member; and
   seat means spaced above the base support means, attached to the columnar support, and including:
      a seat support member having a pair of opposed sides, a pair of ends lying in a plane, and a support contacting surface portion,
      a pair of side bars, one end of each side bar connected to a corresponding side of the seat support member, each side bar having a plurality of spaced adjustment holes,
      an adjustable connecting means pivotally attached to an adjustment hole in each of the side bars, having at least two rigid links and two ends, and operable such that the distance defined between the two ends can be varied.

17. A tree climbing apparatus comprising:
   platform means for supporting the weight of a person, having a pair of sides;
   a pair of splayed, side members having non-parallel portions, one end of each side member connected to a corresponding side of platform means so as to be moveable in the plane of the platform means, each side member having a plurality of spaced adjustment holes;
   a connecting means pivotally attached to an adjustment hole in each of the side members;
   a bracing member attached to the platform means and joining with a cross supporting member to define a tree contacting surface, positioned beneath the platform means; and
   a pair of triangular supports for the platform means, one side being defined by part of the platform means, a second side being defined by the bracing member.

18. The tree climbing apparatus of claim 17 wherein the connecting means includes a pair of rigid links.

19. The tree climbing apparatus of claim 17 wherein the platform means is spaced from the tree contacting the surface of the bracing member by a predetermined distance.

20. A tree stand for use in combination with a vertical columnar member such as a tree comprising:
   a base support means supported on the vertical columnar member including:
      platform means having a pair of opposed sides,
      a pair of splayed, non-parallel side member, one end of each side member connected to a corresponding side of platform means so as to be moveable in the plane of the platform means, each side member having a plurality of spaced adjustment holes,
      a connecting means pivotally attached to an adjustment hole in each of the side members, having at least two rigid links and two ends,
      a bracing member attached to the platform means and defining a tree contacting surface, and
      a pair of triangular supports for the platform means, one side being defined by part of the platform means, a second side being defined by the bracing member; and
   seat means spaced above the base support means, attached to the columnar support, and including;
      a seat support member having a pair of opposed side bars whose ends are directed upwards and having a plurality of adjustment holes, a pair of ends lying in a plane, and a cross support contacting surface portion;
      a connecting means pivotally attached to an adjustment hole in each of the side bars, having at least two rigid links.

* * * * *